United States Patent
Xing et al.

(10) Patent No.: US 11,691,829 B2
(45) Date of Patent: Jul. 4, 2023

(54) CONTAINER SCREENING DEVICE

(71) Applicant: HITACHI INDUSTRY & CONTROL SOLUTIONS, LTD., Hitachi (JP)

(72) Inventors: Yongduo Xing, Hitachi (JP); Hirohisa Fukuda, Hitachi (JP); Kunitaka Asano, Hitachi (JP); Tadahiro Katane, Hitachi (JP)

(73) Assignee: HITACHI INDUSTRY & CONTROL SOLUTIONS, LTD., Hitachi (JP)

( * ) Notice: Subject to any disclaimer, the term of this patent is extended or adjusted under 35 U.S.C. 154(b) by 0 days.

(21) Appl. No.: 17/630,984

(22) PCT Filed: Jul. 29, 2020

(86) PCT No.: PCT/JP2020/028973
§ 371 (c)(1),
(2) Date: Jan. 28, 2022

(87) PCT Pub. No.: WO2021/020417
PCT Pub. Date: Feb. 4, 2021

(65) Prior Publication Data
US 2022/0258989 A1  Aug. 18, 2022

(30) Foreign Application Priority Data

Jul. 31, 2019 (JP) ................. 2019-141804

(51) Int. Cl.
*B65G 47/84* (2006.01)
*B07C 5/342* (2006.01)
(52) U.S. Cl.
CPC ............ *B65G 47/848* (2013.01); *B07C 5/342* (2013.01); *B65G 2201/0235* (2013.01)
(58) Field of Classification Search
CPC .................. B07C 5/342; B65G 47/848; B65G 2201/0235

(Continued)

(56) References Cited

U.S. PATENT DOCUMENTS 2,359,433 A * 10/1944 McNamara ........... C03B 35/125
　　　　　　　　　　　　　　　　　　　　　198/474.1
3,563,379 A *  2/1971 Stapf ..................... B65G 47/848
　　　　　　　　　　　　　　　　　　　　　356/239.6

(Continued)

FOREIGN PATENT DOCUMENTS

CN     207497885 U     6/2018
DE      2738570 C2 *   8/1989   ........... B65G 47/848

(Continued)

OTHER PUBLICATIONS

International Search Report of PCT/JP2020/028973 dated Sep. 25, 2020.

(Continued)

*Primary Examiner* — James R Bidwell
(74) *Attorney, Agent, or Firm* — Mattingly & Malur, PC

(57) ABSTRACT

A container screening device (200) including: a star wheel (60) arranged on or above a conveyance surface (201) on which inspection objects (101) are conveyed and having an outer periphery formed with plural housing portions (110) configured to house the inspection objects (101); a rotation shaft (220) arranged under the conveyance surface (201) and configured to rotate with the star wheel (60); a bearing portion (230) rotatably supporting the rotation shaft (220); air holes (60a, 60b, 220a, 220b) extending through interiors of the star wheel (60) and the rotation shaft (220) and communicating with the rotation shaft (220) and the housing portions (110); and an air coupling (240) fixed to a periphery of the rotation shaft (220) and configured to generate suction force in the air holes (60a, 60b, 220a, 220b) to suck the inspection objects (101) to the housing portions (110).

7 Claims, 11 Drawing Sheets

(58) Field of Classification Search
USPC .......................................... 198/471.1, 478.1
See application file for complete search history.

(56) References Cited

U.S. PATENT DOCUMENTS

| | | | |
|---|---|---|---|
| 8,752,693 B2* | 6/2014 | Voth | B65G 47/846 |
| | | | 198/471.1 |
| 2012/0292159 A1* | 11/2012 | Egerton | B21D 43/14 |
| | | | 198/689.1 |

FOREIGN PATENT DOCUMENTS

| | | |
|---|---|---|
| JP | 04-308122 A | 10/1992 |
| JP | 05-146757 A | 6/1993 |
| JP | 2000-024916 A | 1/2000 |
| JP | 2001-010722 A | 1/2001 |
| JP | 2003-095430 A | 4/2003 |

OTHER PUBLICATIONS

Chinese Office Action received in corresponding Chinese Application No. 202080053744.3 dated Feb. 14, 2023.

* cited by examiner

FIG. 17
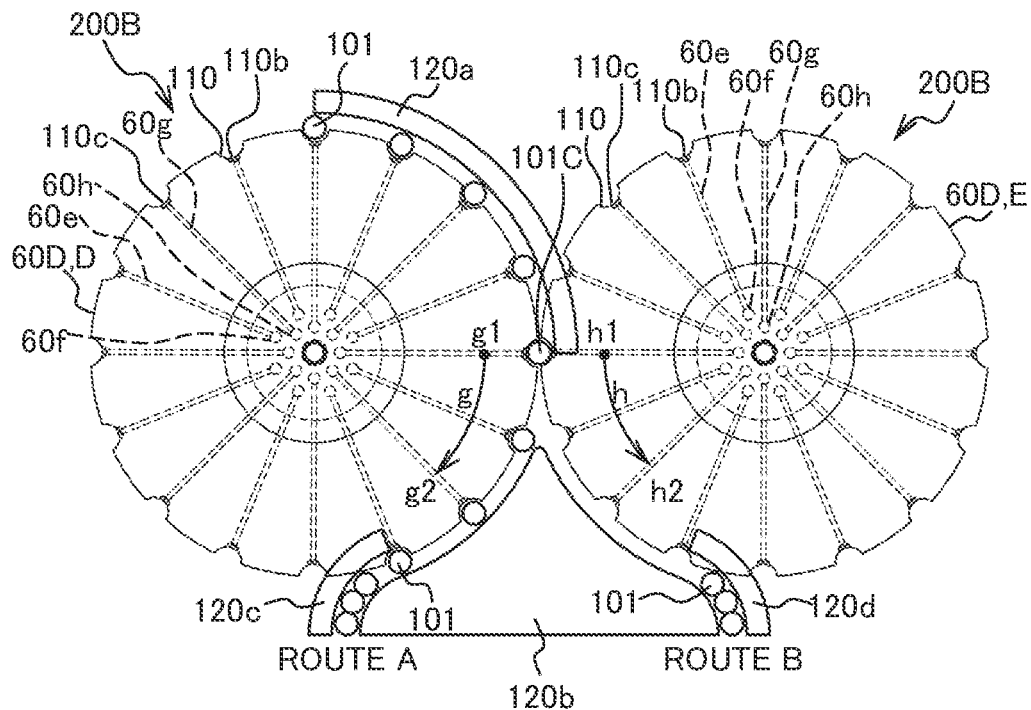
FIG. 18
```
        22.5  67.5  112.5 157.5 202.5 247.5 292.5 337.5
      0     45    90    135   180   225   270   315
                            ROTATION ANGLE OF WHEEL
```
INNER JETTING PORT OF STAR WHEEL D (110c)
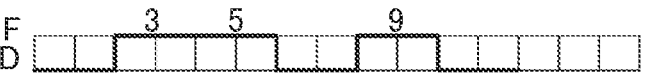
INNER JETTING PORT OF STAR WHEEL E (110c)
OUTER JETTING PORT OF STAR WHEEL D (110b)
OUTER JETTING PORT OF STAR WHEEL E (110b)
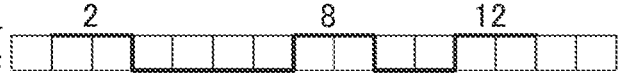
DISCHARGE TO ROUTE A: 3、4、5、6、9、10
DISCHARGE TO ROUTE B: 1、2、7、8、11、12

CONTAINER SCREENING DEVICE

TECHNICAL FIELD

The present invention relates to a container screening device.

BACKGROUND ART

There is known a container screening device that performs foreign object inspection and exterior inspection on containers such as ampules, vials, or syringes by using an image processing device (inspection device) and sorts the containers into non-defective products and defective products based on the inspection results. For example, Patent Literature 1 describes a mechanism in which vacuum pipe passages connecting a star wheel bottom surface and grooves (housing portions) configured to hold the containers is formed, the vacuum pipe passages are connected to a valve plate configured to slide on the star wheel bottom surface while coming into close contact therewith, and the valve plate is connected to a vacuum source, to hold containers and sort the containers into non-defective products and defective products.

PRIOR ART REFERENCE

Patent Literature

Patent Literature 1: Japanese Patent Application Publication No. Hei 4-308122

SUMMARY OF THE INVENTION

Problem to be Solved

In the mechanism described in Patent Literature 1, the star wheel needs to slide on the valve plate while being in close contact therewith to surely hold the containers in the grooves (housing portions). Accordingly, a device such as an adjustable mechanism needs to be provided on the valve plate side to absorb unevenness of the star wheel and the like and a gap is formed between the conveyance surface and the valve plate. However, a problem of this technique is that, if a container breaks, contents and broken pieces of the container fall from a gap between the valve plate and the conveyance surface into the device interior.

The present invention has been made to solve the aforementioned conventional problem and an object is to provide a container screening device in which foreign objects such as contents of a container are prevented from entering a device interior.

Means to Solve the Problem

The present invention is a container screening device including a star wheel which is arranged on or above a conveyance surface on which containers are conveyed and that has an outer periphery formed with plural housing portions configured to house the containers, a rotation shaft configured to rotate the star wheel, a bearing portion rotatably supporting the rotation shaft, communication passages which extend through interiors of the star wheel and the rotation shaft and which communicate with the rotation shaft and the housing portions, and a container suction force generation member fixed to a periphery of the rotation shaft and configured to generate suction force in the communication passages to suck the containers to the housing portions.

Advantageous Effects of the Invention

The present invention can provide a container screening device which prevents foreign objects such as contents of a container from entering a device interior.

BRIEF DESCRIPTION OF DRAWINGS

FIG. 17 is a diagram illustrating a conveyance operation of the container screening device in the third embodiment.

FIG. 18 is a timing chart illustrating a conveyance operation of the container screening device in the third embodiment.

EMBODIMENTS OF THE INVENTION

Embodiments of the present invention are described below in detail by using the drawings.

First Embodiment

Figure 1:
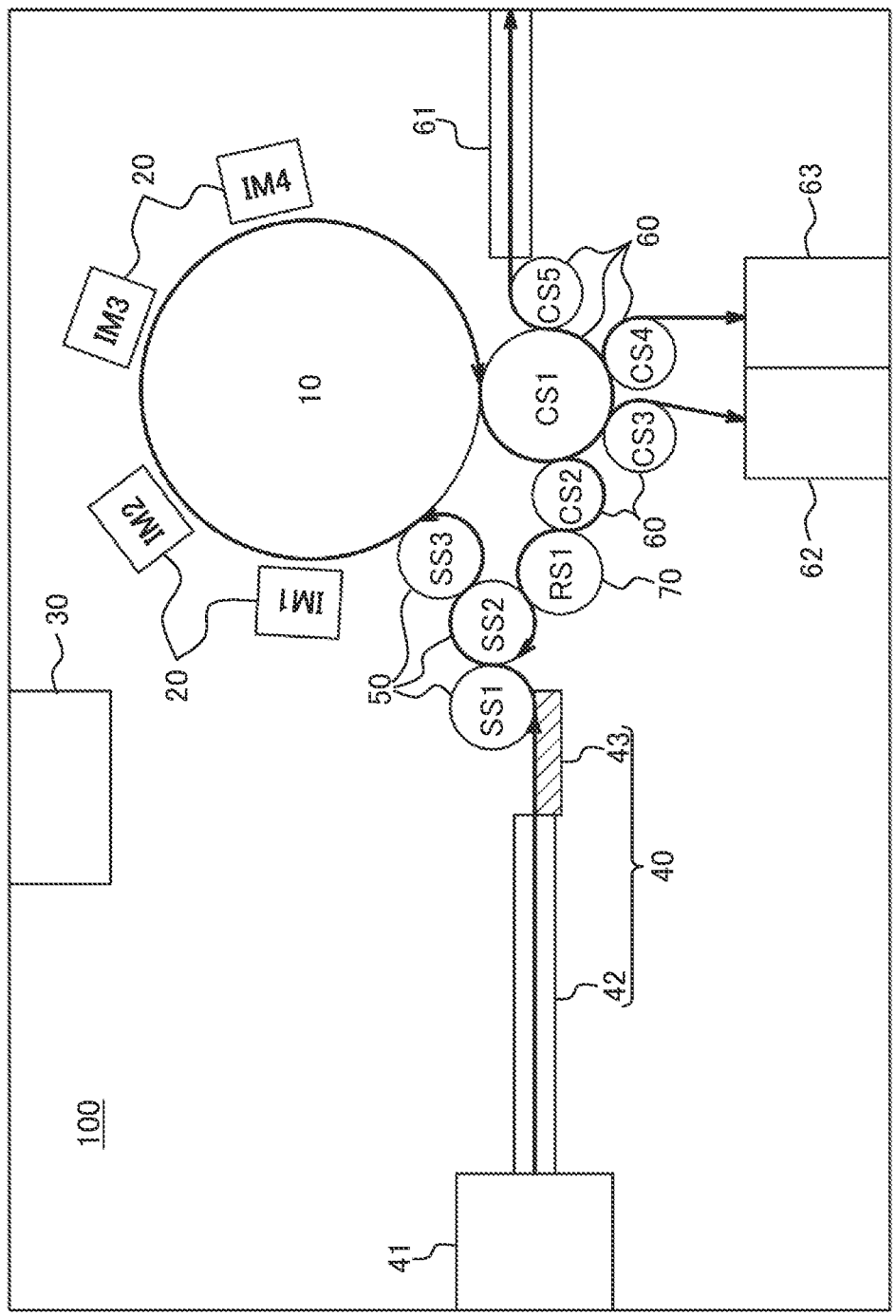
FIG. 1 is an overall configuration diagram of a container-packaged liquid product inspection apparatus including a container screening device of a first embodiment.

FIG. 1 is an overall configuration diagram of a container-packaged liquid product inspection apparatus including a container screening device of a first embodiment. Note that, in the embodiment, a container-packaged liquid product is assumed to be a medical solution product put in a container such as an ampule, a vial, or a syringe, and the container in which the medical solution to be inspected is put is simply referred to as an inspection object hereinafter.

As illustrated in FIG. 1, a container-packaged liquid product inspection apparatus 100 includes an inspection rotor 10, inspection object image inspection devices 20, an inspection control device 30, a loaded inspection object conveyance device 40, inspection object supplying star wheels 50, inspection object sorting star wheels 60, an inspection object return star wheel 70, and the like. Note that a sorting mechanism of the container screening device of the present invention is employed in the inspection object sorting star wheels 60.

Figure 2:
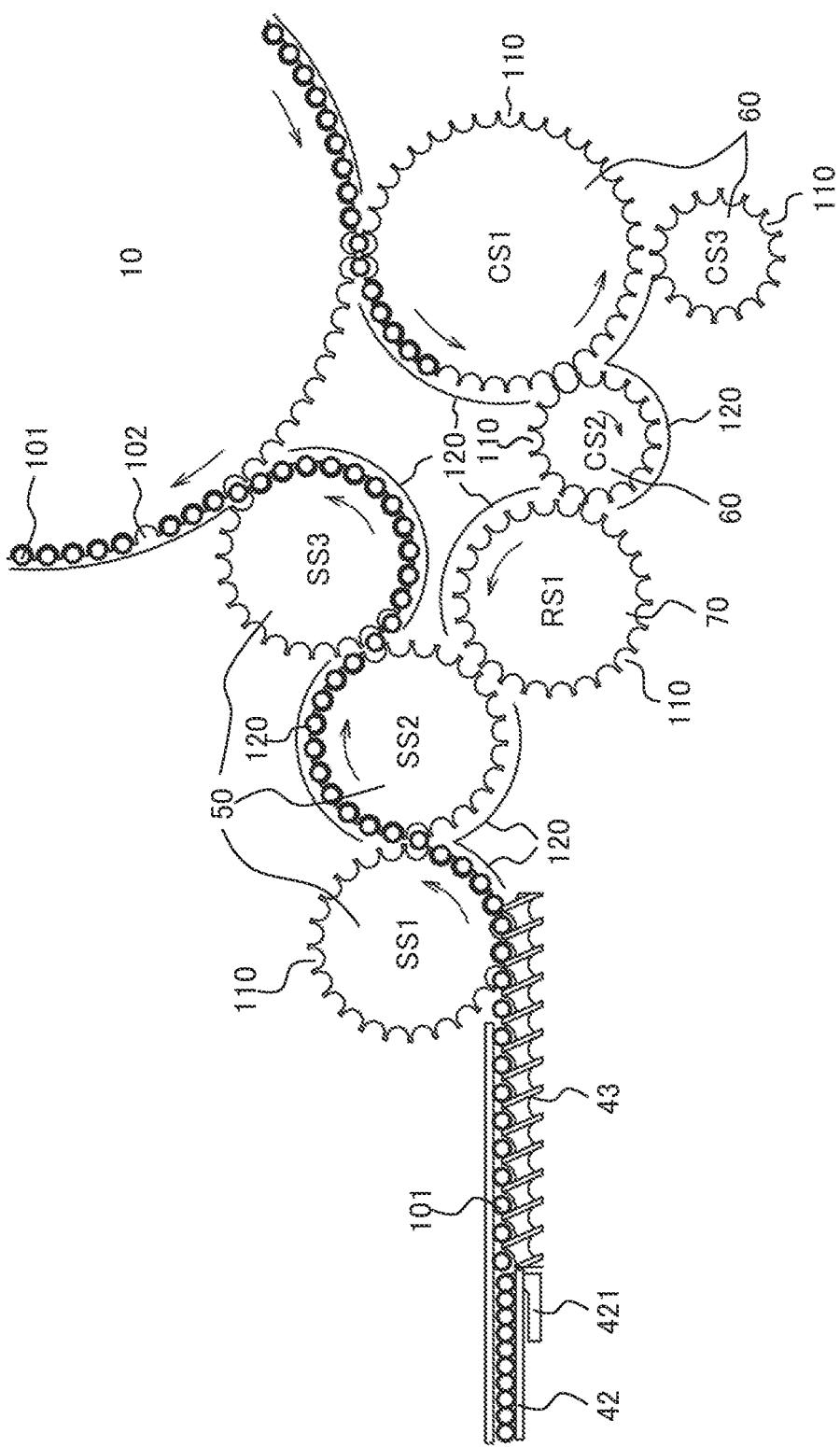
FIG. 2 is a diagram schematically illustrating how inspection objects are conveyed in the container-packaged liquid product inspection apparatus.

FIG. 2 is a diagram schematically illustrating how the inspection objects are conveyed in a main portion of the container-packaged liquid product inspection apparatus.

As illustrated in FIG. 2, the inspection rotor 10 is configured such that multiple inspection object holding portions 102 configured to hold the inspection objects 101 are provided at even intervals in a peripheral edge portion of a disc or a cylinder. Moreover, the inspection rotor 10 rotates in one direction about the center of the disc or the cylinder and conveys the inspection objects 101, for example, clockwise in FIG. 2. Note that the inspection rotor 10 is not limited to an annular conveyance device and may have any form as long as a conveyance route has a circulating shape and the inspection object holding portions 102 are provided at even intervals on the conveyance route having the circulating shape and travel at predetermined speed on the conveyance route having the circulating shape.

Returning to FIG. 1, the inspection object image inspection devices 20 are provided at positions near an outer peripheral portion of the inspection rotor 10 but spaced away from the inspection rotor 10. When the inspection objects 101 (see FIG. 2) held by the inspection object holding portions 102 (see FIG. 2) pass in front of the inspection object image inspection devices 20, the inspection object image inspection devices 20 obtain exterior images of the inspection objects 101 with not-illustrated imaging devices such as cameras. Foreign objects in the solution, exterior defects of the containers, and the like in the inspection objects 101 are detected by using the obtained exterior images.

Note that, in the embodiment, multiple inspection object image inspection devices 20 are provided at multiple positions in the outer peripheral portion of the inspection rotor 10 (in an example of FIG. 1, four inspection object image inspection devices 20 of IM1 to IM4 are provided). The inspection object image inspection devices 20 obtain the external images of the inspection objects 101 in various states, respectively, and detect defects in the inspection objects 101. Moreover, although the inspection object image inspection devices 20 are provided in the outer peripheral portion of the inspection rotor 10 in the embodiment, the inspection object image inspection devices 20 may be provided in an inner peripheral portion of the inspection rotor 10.

The inspection control device 30 is formed of a computer including at least a CPU (central processing unit) and a storage device. Moreover, the inspection control device 30 determines whether each inspection object 101 is a non-defective product or a defective product based on the inspection results from the respective inspection object image inspection devices 20. Moreover, the inspection control device 30 determines that the inspection object 101 for which no inspection results from the inspection object image inspection devices 20 are obtained is an uninspected product.

The defective products may be further sorted into smaller categories such as exterior defective product, foreign object defective product, and the like. Hereinafter, in the embodiment, the defective products are assumed to be sorted into smaller categories of exterior defective product and foreign object defective product. Moreover, the inspection control device 30 stores sorting information that indicates into which one of the non-defective product, the defective product, and the uninspected product for each inspection object 101 is sorted, in the storage device (not illustrated), and notifies the sorting information to the inspection object sorting star wheels 60.

The loaded inspection object conveyance device 40 is a conveyance device that conveys the inspection objects 101 loaded from an inspection object loading portion 41 toward the inspection rotor 10 and is formed of a supply conveyor 42, a supply screw 43, and the like. The supply conveyor 42 is formed of a belt conveyor or the like, and unloads and conveys the inspection objects 101 from the inspection object loading portion 41 to deliver the conveyed inspection objects 101 to the supply screw 43.

The supply screw 43 is formed of a so-called worm screw. The inspection objects 101 are held in a groove of the worm screw and are conveyed with rotation of the worm screw. Note that a first conveyance suppression gate 421 (see FIG. 2) is provided in a portion of the supply conveyor 42 where the supply conveyor 42 delivers the inspection objects 101 to the supply screw 43.

The inspection object supplying star wheels 50 receive the inspection objects 101 from the supply screw 43 of the loaded inspection object conveyance device 40, convey the received inspection objects 101 to the position of the inspection rotor 10, and deliver the inspection objects 101 to the inspection object holding portions 102 of the inspection rotor 10. In the embodiment, the inspection object supplying star wheels 50 include three star wheels SS1 to SS3.

Note that the star wheel refers to a circular-gear-shaped conveyance device including housing portions 110 in a peripheral edge portion thereof like the star wheels SS1 to SS3 illustrated in FIG. 2. Specifically, the star wheel houses the inspection objects 101 in tooth space portions of the circular gear shape. The inspection objects 101 are conveyed with rotation of the star wheel with an outer edge portion of the star wheel serving as a conveyance route. Note that, in the star wheel, a conveyance route portion in which the inspection objects 101 are conveyed is provided with a guide 120 that prevents the inspection objects 101 from protruding out from the housing portions 110.

The inspection object sorting star wheels 60 receive the inspection objects 101 discharged from the inspection rotor 10, sort each of the received inspection objects 101 into one of the non-defective product, the exterior defective product, the foreign object defective product, and the uninspected product based on the sorting information on the inspection object 101 notified from the inspection control device 30 (see FIG. 1), and discharge the inspection object 101.

The inspection object sorting star wheels 60 include five star wheels CS1 to CS5. The star wheel CS1 receives the inspection objects 101 discharged from the inspection rotor 10 and, when each of the inspection objects 101 approaches a branch point with the star wheel CS2, determines whether the inspection object 101 is which one of the non-defective product, the defective product, and the uninspected product, based on the sorting information notified from the inspection control device 30. When the inspection object 101 is the uninspected product, the star wheel CS1 delivers the inspection object 101 to the star wheel CS2. Meanwhile, when the inspection object 101 is not the uninspected product, the star wheel CS1 continues to rotate while holding the inspection object 101.

Note that the branch point in the star wheel CS1 refers to a position where conveyance routes provided in outer edge portions of the respective star wheels CS1 and CS2 come closest to each other and a branch mechanism (sorting mechanism) that selects to which one of the conveyance routes the inspection object 101 is to be conveyed is provided at the branch point. In the branch mechanism, for example, air or the like is jetted out depending on the branching condition to generate suction force in the housing portion 110 of one of the star wheels and move the inspection object 101 toward the housing portion 110 in which the suction force is generated.

Similarly, the star wheel CS1 determines whether the inspection object 101 is the exterior defective product or not based on the sorting information from the inspection control device 30 at a branch point with the star wheel CS3. When the inspection object 101 is the exterior defective product, the star wheel CS1 delivers the inspection object 101 to the star wheel CS3. Moreover, the star wheel CS1 determines whether the inspection object 101 is the foreign object defective product or not based on the sorting information from the inspection control device 30 at a branch point with the star wheel CS4. When the inspection object 101 is the foreign object defective product, the star wheel CS1 delivers the inspection object 101 to the star wheel CS4.

Moreover, the star wheel CS1 delivers all inspection objects 101 conveyed to the branch point with the star wheel CS5 to the star wheel CS5 as the non-defective products at this branch point. The star wheel CS5 delivers the received inspection objects 101 to a non-defective product conveyor 61. The non-defective product conveyor 61 conveys the inspection objects 101 to the next step.

Furthermore, the star wheel CS3 discharges the inspection object 101 received from the star wheel CS1 to an exterior defective product tray 62 as the exterior defective product. Similarly, the star wheel CS4 discharges the inspection object 101 received from the star wheel CS1 to a foreign object defective product tray 63 as the foreign object defective product.

Moreover, the star wheel CS2 delivers the inspection object 101 received from the star wheel CS1 to the inspection object return star wheel 70 (RS1) as the uninspected product. Then, the inspection object return star wheel 70 delivers the received inspection object 101 to the inspection object supplying star wheels 50 (SS2). Specifically, in the embodiment, the inspection object return star wheel 70 is provided to allow the uninspected inspection object 101 to return to the inspection object supplying star wheels 50 and the uninspected inspection object 101 is conveyed to the inspection rotor 10 and is inspected by the inspection object image inspection devices 20 again.

Note that, in the first embodiment illustrated in FIG. 1, the container screening device is employed at each of the branch points, that is the star wheels CS1 to CS4 where the container (inspection object 101) is branched.

Figure 3:
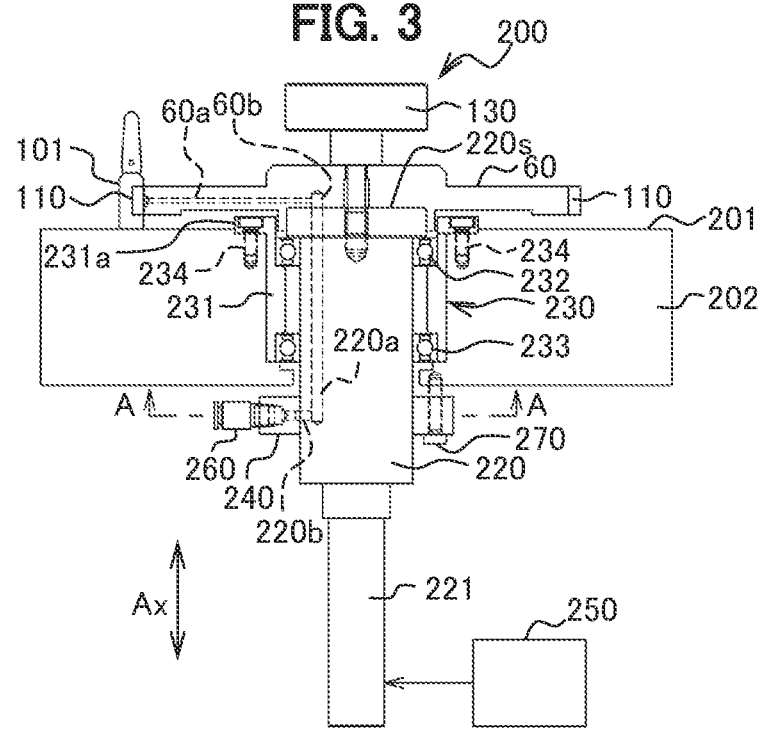
FIG. 3 is a vertical cross-sectional diagram illustrating the container screening device in the first embodiment.

FIG. 3 is a vertical cross-sectional diagram illustrating the container screening device in the first embodiment.

As illustrated in FIG. 3, a container screening device 200 includes the star wheel 60, a rotation shaft 220, a bearing portion 230, and an air coupling (container suction force generation member) 240. Note that the star wheel 60 corresponds to, for example, the star wheels CS1 to CS4 described above.

The star wheel 60 is arranged on a horizontal conveyance surface 201 of the container screening device 200. Moreover, the star wheel 60 rotates in a state arranged above and slightly away from the conveyance surface 201. Furthermore, the star wheel 60 holds the inspection objects 101 in an outer peripheral edge thereof and conveys the inspection objects 101 with bottom surfaces of the inspection objects 101 sliding on the conveyance surface 201.

The rotation shaft 220 is formed to vertically extend downward from the conveyance surface 201 and the star wheel 60 is fixed to an upper end surface of the rotation shaft 220. A handle 130 configured to be operated when the star wheel 60 is attached to and detached from the rotation shaft 220 is provided in an upper portion of a rotation center of the star wheel 60. Although not illustrated, an alignment pin is provided between the star wheel 60 and the rotation shaft 220. This causes the star wheel 60 to rotate together with the rotation shaft 220.

Moreover, the rotation shaft 220 protrudes from a lower surface of a conveyance stage 202 in which the conveyance surface 201 is formed. Furthermore, a transmission shaft 221 that transmits rotation drive force to the rotation shaft 220 is formed to be coaxial with the rotation shaft 220. The outer diameter of the transmission shaft 221 is formed to be smaller than the outer diameter of the rotation shaft 220. Moreover, the transmission shaft 221 is connected to an electric motor 250 via a not-illustrated pulley.

The bearing portion 230 supports the rotation shaft 220 while allowing the rotation shaft 220 to rotate, and includes a base member 231 and bearings (thrust bearings) 232 and 233.

The base member 231 is formed in a substantially cylindrical shape and an annular flange portion 231a is formed in an upper end portion of the base member 231. The flange portion 231a protrudes upward from the conveyance surface 201. Bolts 234 are inserted in the flange portion 231a and screwed to the conveyance stage 202 to fasten the base member 231 to the conveyance stage 202. The bearings 232 and 233 are arranged in upper and lower portions of the base member 231.

Air holes (communication holes) 60a extending in radial directions are formed in the star wheel 60. One ends of the air holes 60a extend to the housing portions 110 and the other ends extend to positions close to the rotation center of the star wheel 60. In detail, the other ends of the air holes 60a extend to positions overlapping the rotation shaft 220 in an axial direction (vertical direction). Moreover, air holes 60b that communicate with the other ends of the air holes 60a and that extend in the axial direction (vertical direction) for a short distance are formed in the star wheel 60. Lower ends of the air holes 60b are formed to be open on a lower surface of the star wheel 60. The air holes 60a and 60b are thus formed to penetrate an interior of the star wheel 60.

Air holes 220a extending in the axial direction Ax are formed in the rotation shaft 220. Upper ends (one ends) of the air holes 220a are open on an upper end surface 220s of the rotation shaft 220. Moreover, air holes 220b that communicate with lower ends (other ends) of the air holes 220a and that extend outward in radial directions are formed in the rotation shaft 220. As described above, the air holes 220a and 220b are formed to penetrate the interior of the rotation shaft 220.

Moreover, since the star wheel 60 is formed to be fastened to the rotation shaft 220 and the star wheel 60 and the rotation shaft 220 are in close contact with each other, sufficient airtightness is secured at boundaries between the air holes 60b of the star wheel 60 and the air holes 220a of the rotation shaft 220. Specifically, no air leak occurs at the boundaries between the air holes 60b and the air holes 220a.

The air coupling 240 is a unit that supplies air from the air holes 220b of the rotation shaft 220 and is arranged below the conveyance stage 202. Moreover, the air coupling 240 is formed in a substantially annular shape (C shape) to surround the rotation shaft 220. Furthermore, the air coupling 240 is fixed to the lower surface of the conveyance stage 202 with bolts 270. Specifically, air from the air coupling 240 fixed outside the rotating member (rotation shaft 220) is supplied to the rotating member. The thickness of the conveyance stage 202 is formed to be smaller than the length of the rotation shaft 220 in the axial direction Ax.

Figure 4:
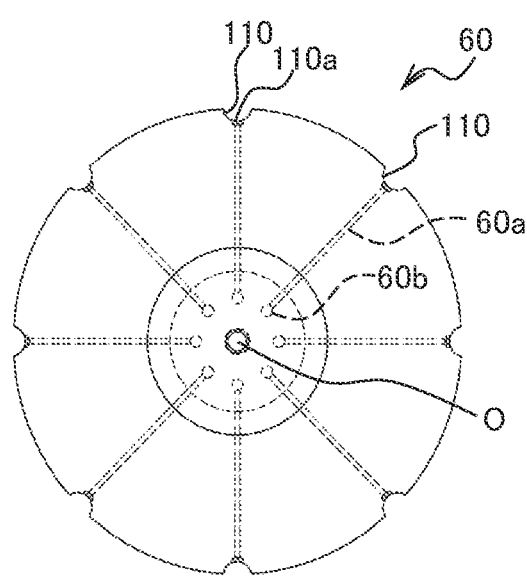
FIG. 4 is a plan diagram illustrating a star wheel of the container screening device in the first embodiment.

FIG. 4 is a plan diagram illustrating the star wheel of the container screening device in the first embodiment.

As illustrated in FIG. 4, eight housing portions 110 are formed in the outer peripheral edge portion of the disc in the star wheel 60. The housing portions 110 are arranged at even intervals in a circumferential direction. Note that FIG. 4 illustrates a state where the number of housing portions 110 is different from that in FIG. 2 for the sake of explanation.

In the star wheel 60, the air holes 60a extending in the radial directions are formed at positions corresponding to the respective housing portions 110. All air holes 60a are formed to have the same length. Jetting ports 110a that are formed by opening end portions of the air holes 60a and that blow out air are formed on recess shaped wall surfaces of the housing portions 110. Moreover, end portions of the air holes 60a on the inner side in the radial directions communicate with the air holes 60b. Furthermore, the jetting ports 110a are formed such that an opening area on the outer side is larger than that on the inner side.

Figure 5:
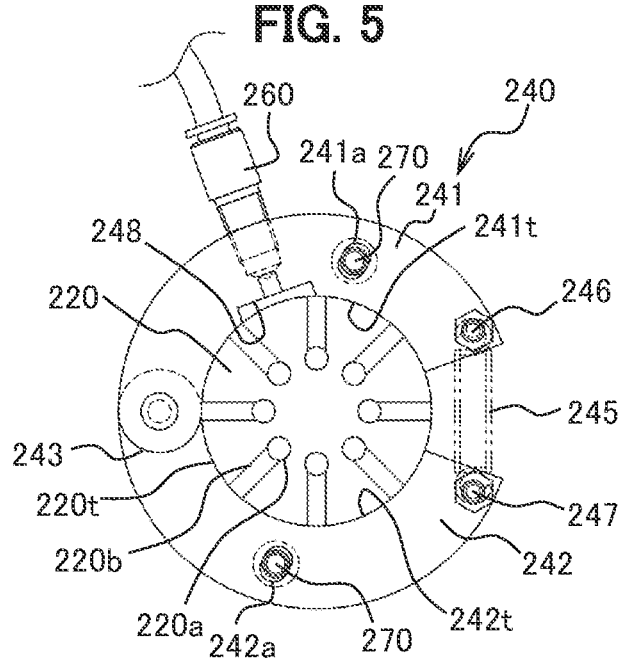
FIG. 5 is a cross-sectional diagram along the A-A line in FIG. 3.

FIG. 5 is a cross-sectional diagram along the A-A line in FIG. 3.

As illustrated in FIG. 5, the air coupling 240 includes paired holding portions 241 and 242 formed in arc shapes and end portions (one ends) of the holding portions 241 and 242 are turnably connected to each other by a hinge 243. The holding portions 241 and 242 can be thus attached to the rotation shaft 220 to embrace it by opening and closing the holding portions 241 and 242.

Moreover, the holding portions 241 and 242 are each formed to have a smaller length than a semi-circular arc in the circumferential direction. The holding portions 241 and 242 are thereby spaced away from each other in the circumferential direction when the rotation shaft 220 is held by and between the holding portions 241 and 242.

Moreover, a coil spring (elastic member) 245 is laid between end portions (other ends) of the holding portions 241 and 242. A lock portion 246 to which one end of the coil spring 245 is locked is formed in the end portion of the holding portion 241 and a lock portion 247 to which the other end of the coil spring 245 is locked is formed in the end portion of the holding portion 242. Elastic force is thereby generated in a direction in which the holding portions 241 and 242 come close to each other, and inner peripheral surfaces 241t and 242t of the holding portions 241 and 242 can be brought into close contact with an outer peripheral surface 220t of the rotation shaft 220.

Moreover, slotted holes 241a and 242a penetrating the holding portions 241 and 242 in the axial direction Ax (see FIG. 3) are formed in the holding portions 241 and 242. The slotted holes 241a and 242a are formed to elongate substantially in the radial directions. The bolts 270 are inserted into the slotted holes 241a and 242a and are fastened to the conveyance stage 202 (see FIG. 3). Moreover, using the slotted holes 241a and 242a allows adjustment of the close contact state between the rotation shaft 220 and the inner peripheral surfaces 241t and 242t of the holding portions 241 and 242.

Moreover, an elongated groove 248 is formed on the inner peripheral surface 241t of the holding portion 241. The elongated groove 248 is formed to extend in the circumferential direction. Moreover, a tube 260 configured to introduce air is connected to the holding portion 241 at a position where the elongated groove 248 is formed. The tube 260 communicates with the elongated groove 248. Note that an air supply source (for example, pump) configured to supply air is connected to the tube 260. Moreover, the length of the elongated groove 248 in the circumferential direction is set such that the elongated groove 248 communicates with one of the air holes 220b.

Although the example in which the rotation shaft 220 rotates with the entire inner peripheral surfaces 241t and 242t being in contact with the outer peripheral surface of the rotation shaft 220 is described in the embodiment, multiple grooves may be formed at positions different from that of the elongated groove 248 on the inner peripheral surfaces 241t and 242t to reduce the contact area between the rotation shaft 220 and the holding portions 241 and 242.

Figure 6:
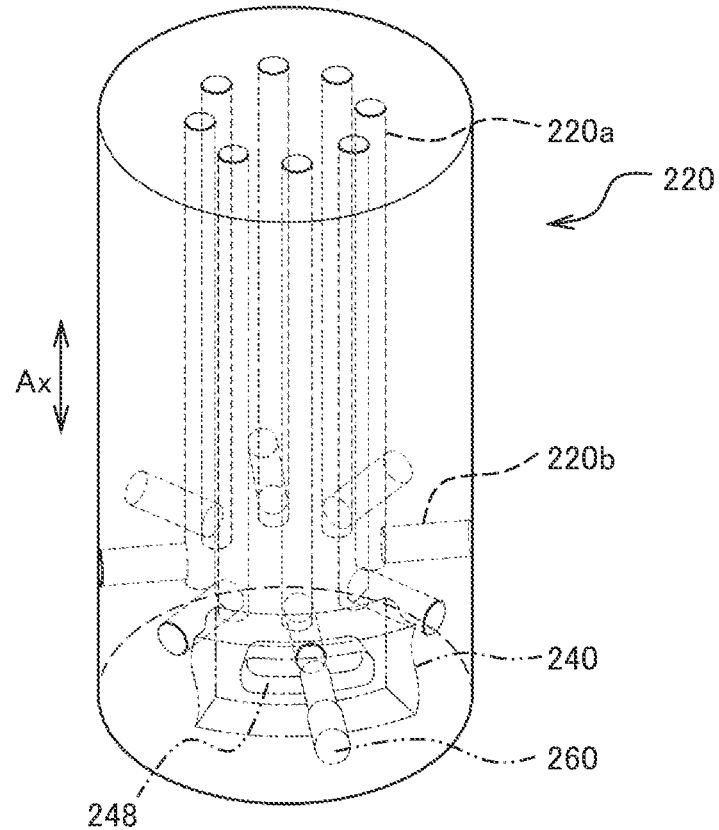
FIG. 6 is a perspective diagram illustrating a structure of the rotation shaft in the container screening device of the first embodiment.

FIG. 6 is a perspective diagram illustrating a structure of the rotation shaft of the container screening device in the first embodiment. Note that FIG. 6 illustrates only part of the air coupling 240.

As illustrated in FIG. 6, multiple (eight in the embodiment) air holes 220a extending in the axial direction Ax are formed in the rotation shaft 220. Upper ends of the air holes 220a are formed to open and are connected to the air holes 60b (see FIG. 4) formed in the star wheel 60.

Moreover, the air holes 220b extending outward in the radial directions at lower ends of the air holes 220a are formed in the rotation shaft 220. The air holes 220b are formed at intervals of 45°. Furthermore, the air holes 220b are formed to open (penetrate) on the outer peripheral surface of the rotation shaft 220.

In the container screening device 200 (see FIG. 3) configured as described above, air supplied from the tube 260 passes through the elongated groove 248 and is introduced into one of the air holes 220b of the rotation shaft 220. The air introduced into the air hole 220b rises through the air hole 220a extending in the axial direction Ax and is introduced into the air hole 60b (see FIG. 4) of the star wheel 60. The air introduced into the air hole 60b passes through the air hole 60a (see FIG. 4) extending in the radial direction and is jetted out from the jetting port 110a (see FIG. 4) of the housing portion 110. When air is jetted out from the jetting port 110a of the housing portion 110 with the inspection object 101 (see FIG. 3) housed in the housing portion 110, the inspection object 101 can be sucked toward the housing portion 110 on the side where air is jetted out, by Bernoulli's principle. Jetting out air from the housing portion 110 allows the inspection object 101 to be conveyed with the inspection object 101 sucked to the housing portion 110 of the star wheel 60 as described above.

Figure 7:
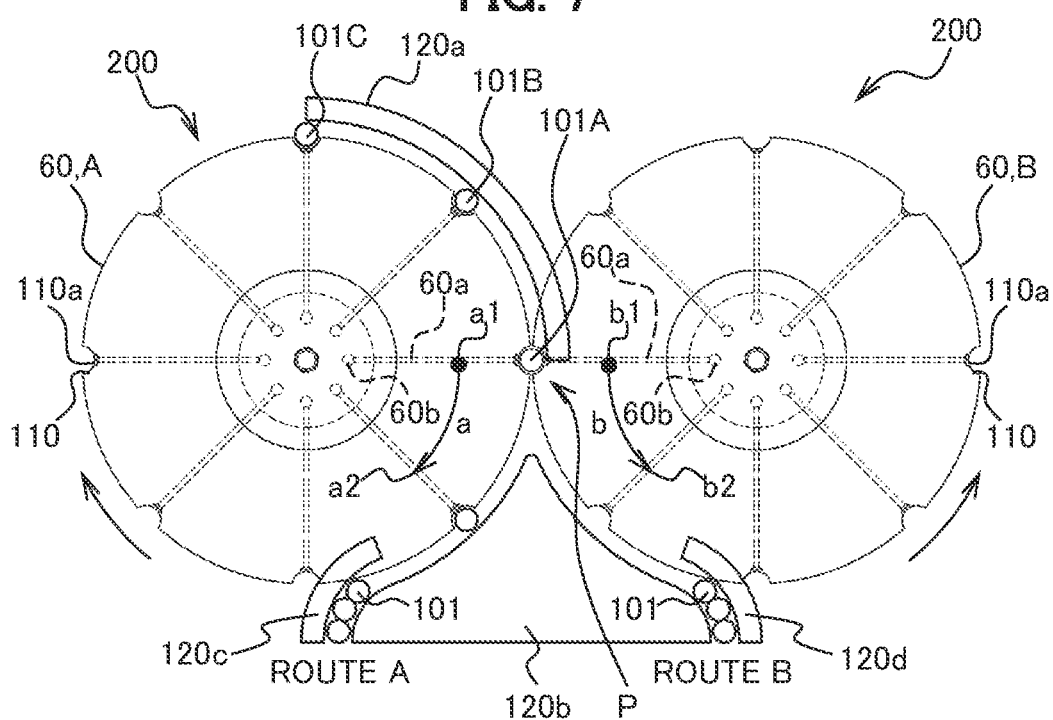
FIG. 7 is a diagram illustrating a conveyance operation of the container screening device in the first embodiment.

FIG. 7 is a diagram illustrating a conveyance operation of the container screening device in the first embodiment. Note that, in order to facilitate explanation, description is given of an example in which the diameter of the delivery side star wheel and the diameter of the reception side star wheel are the same.

As illustrated in FIG. 7, the container screening device of the embodiment is formed by combining two container screening devices 200. In each of the container screening devices 200, the container sorting mechanism illustrated in FIGS. 3 to 6 is provided in the star wheel 60. In the following explanation, one (left in FIG. 7) star wheel 60 is referred to as a star wheel A and the other (right in FIG. 7) star wheel 60 is referred to as a star wheel B.

The star wheel A rotates clockwise and the star wheel B rotates counterclockwise. Moreover, the star wheels A and B synchronously rotate such that the housing portions 110 of both star wheels A and B are aligned to each other. Furthermore, the star wheels A and B are configured such that the housing portion 110 of the star wheel A and the housing portion 110 of the star wheel B come closest to each other at a branch start point P and the housing portions 110 and 110 surround the entire periphery of an inspection object 101A (101).

A guide 120a is provided on the inspection object 101 introduction side (entrance side) of the star wheel A. The guide 120a (120) is formed along an outer peripheral surface of the star wheel A and prevents the inspection object 101 from protruding out from the housing portion 110.

Moreover, guides 120b, 120c, and 120d (120) are provided on the inspection object 101 lead-out side (exit side, discharge side) of the star wheels A and B. The guide 120b is formed along the outer peripheral surface of the star wheel A and an outer peripheral surface of the star wheel B and is formed in a substantially triangular shape. The guide 120c has an arc shape that guides the inspection object 101 from the star wheel A to a route A together with the guide 120b. The guide 120d has an arc shape that guides the inspection object 101 from the star wheel B to a route B together with the guide 120b.

The case where the inspection object 101A (101) is discharged to the route A in FIG. 7 is described below. In this case, when the inspection object 101A is at a position a1 where it is held by and between the star wheel A and the star wheel B, air is jetted out from the jetting port 110a in the housing portion 110 of the star wheel A where the inspection object 101A is housed and no air is jetted out from the jetting port 110a in the housing portion 110 of the star wheel B where the inspection object 101A is housed. Specifically, when the corresponding air hole 220b (see FIG. 5) faces the elongated groove 248 (see FIG. 5), air is introduced into the elongated groove 248 from the tube 260 (see FIG. 5). The air thereby passes through the air holes 220b and 220a (see FIG. 6) and is introduced into the air hole 60b of the star wheel A. Then, the air passes through the air hole 60a and is jetted out from the jetting port 110a of the corresponding housing portion 110 and the inspection object 101A is sucked to the housing portion 110 of the star wheel A. The air is jetted out from the jetting port 110a until the inspection object 101A reaches a position a2 where the branch ends. This is because the elongated groove 248 (see FIG. 5) is formed in the air coupling 240 to extend in the circumferential direction and air is thus continuously jetted out while the inspection object 101A is moved from the position a1 to the position a2 (in a range a).

Meanwhile, in the case where the inspection object 101A (101) is to be discharged to the route B, air is jetted out from the jetting port 110a in the housing portion 110 of the star wheel B and no air is jetted out from the jetting port 110a in the housing portion 110 of the star wheel A when the inspection object 101A is at a position b1 where it is held by and between the housing portion 110 of the star wheel A and the housing portion 110 of the star wheel B. Specifically, when the corresponding air hole 220b (see FIG. 5) faces the elongated groove 248 (see FIG. 5), air is introduced into the elongated groove 248 from the tube 260 (see FIG. 5). The air thereby passes through the air holes 220b and 220a (see FIG. 6) and is introduced into the air hole 60b of the star wheel B. Then, the air passes through the air hole 60a and is jetted out from the jetting port 110a of the corresponding housing portion 110 and the inspection object 101A is sucked to the housing portion 110 of the star wheel B. The air is jetted out from the jetting port 110a until the inspection object 101A reaches a position b2 where the branch ends. This is because the elongated groove 248 (see FIG. 5) is formed in the air coupling 240 to extend in the circumferential direction and air is thus continuously jetted out while the inspection object 101A is moved from the position b1 to the position b2 (in a range b).

Figure 8:
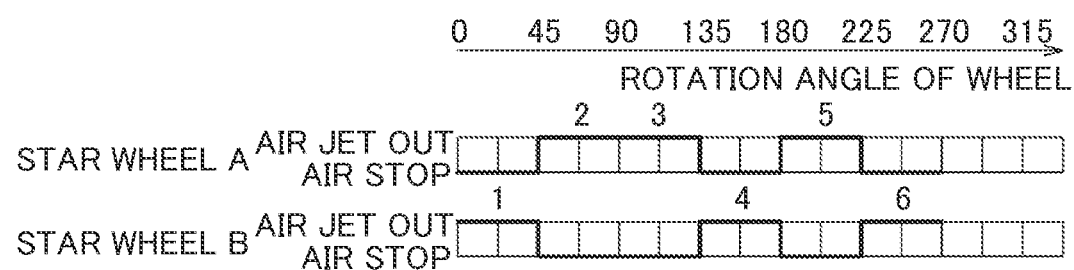
FIG. 8 is a timing chart illustrating a conveyance operation of the container screening device in the first embodiment.

FIG. 8 is a timing chart illustrating a conveyance operation of the container screening device in the first embodiment. Note that the numbers illustrated in FIG. 8 are container numbers and, for example, the container number 1 indicates the first inspection object 101 (see the inspection object 101A in FIG. 7) and the container number 2 indicates the second inspection object 101 (see an inspection object 101B in FIG. 7). In the following description, the container numbers 2, 3, and 5 are the inspection objects 101 to be discharged to the route A and the container numbers 1, 4, and 6 are the inspection objects 101 to be discharged to the route B. Moreover, the horizontal axis represents a rotation angle of the star wheels A and B. Furthermore, in FIG. 7, the inspection object denoted by the reference sign 101A is the first inspection object, the inspection object denoted by the reference sign 101B is the second inspection object, and the inspection object denoted by the reference sign 101C is the third inspection object. Note that illustration of the fourth inspection object and beyond is omitted. Moreover, the position of the first inspection object 101A in FIG. 7 is referred to as rotation angle 0°.

As illustrated in FIG. 8, air is jetted out (air jet out) from the jetting port 110a in the housing portion 110 of the star wheel B and the air jet out from the star wheel A is stopped (air stop) while the inspection object 101A (see FIG. 7) with the container number 1 (first) is conveyed from the position b1 to the position b2 (in the range b). The inspection object 101A with the container number 1 is thereby kept on being held in the housing portion 110 of the star wheel B until the inspection object 101A reaches the position b2 (branch end). Then, when the inspection object 101A with the container number 1 passes the position b2 (rotation angle 45°), the air jet out from the star wheel B is stopped. Generation of the suction force to suck the inspection object 101 is thereby stopped. Then, the inspection object 101A is discharged to the route B by the guide 120b and the guide 120d.

Regarding the inspection object 101B (see FIG. 7) with the container number 2 (second) subsequent to the container number 1, after the rotation from 0° to 45°, air is jetted out from the jetting port 110a in the housing portion 110 of the star wheel A simultaneously with the stop of the air jet out in the star wheel B. Air is jetted out from the star wheel A and the air jet out from the star wheel B is stopped while the inspection object 101B with the container number 2 is conveyed from the position a1 to the position a2 (in the range a). The inspection object 101B with the container number 2 is thereby kept on being held in the housing portions 110 of the star wheel A until the inspection object 101B reaches the position a2 (branch end). Then, when the inspection object 101B with the container number 2 passes the position a2 (rotation angle 90°), generation of the suction force to suck the inspection object 101B with the container number 2 to the housing portion 110 is stopped. Then, the inspection object 101B is discharged to the route A by the guide 120b and the guide 120c.

Regarding the inspection object 101C (see FIG. 7) with the container number 3 (third) subsequent to the container number 2, after the rotation from 0° to 90°, air is jetted out the star wheel A and the air jet out in the star wheel B is stopped. Air is jetted out from the star wheel A and the air jet out from the star wheel B is stopped while the inspection object 101C with the container number 3 is conveyed from the position a1 to the position a2 (in the range a). The inspection object 101C with the container number 3 is thereby kept on being held in the housing portions 110 of the star wheel A until the inspection object 101C reaches the position a2 (branch end). Then, when the inspection object 101C with the container number 3 passes the position a2 (rotation angle 135°), generation of the suction force to suck the inspection object 101C with the container number 3 to the housing portion 110 is stopped. Then, the inspection object 101C is discharged to the route A by the guide 120b and the guide 120c.

The inspection object 101 with the container number 4 is discharged to the route B like the inspection object 101A with the container number 1. The inspection object 101 with the container number 5 is discharged to the route A like the inspection objects 101B and 101C with the container numbers 2 and 3. The inspection object 101 with the container number 6 is discharged to the route B like the inspection objects 101A and 101 with the container numbers 1 and 4.

Appropriately controlling the container screening device 200 including the star wheel A and the container screening device 200 including the star wheel B based on the inspection results from the inspection object image inspection devices 20 as described above enables sorting of the inspection objects 101 into defective and non-defective products. For example, in the container-packaged liquid product inspection apparatus 100 illustrated in FIG. 1, each inspection object 101 can be kept on being held by the star wheel CS1 or branched to the star wheel CS3 and discharged to the exterior defective product tray 62. Moreover, each inspection object 101 can be kept on being held by the star wheel CS1 or branched to the star wheel CS4 and discharged to the foreign object defective product tray 63. Furthermore, each inspection object 101 can be kept on being held by the star wheel CS1 or branched to the star wheel CS2 and returned to the inspection object return star wheel 70.

As described above, the container screening device 200 of the first embodiment includes the star wheel 60 that is arranged on the conveyance surface 201 on which the inspection objects 101 are conveyed and that has the outer periphery in which multiple housing portions 110 configured to house the inspection objects 101 are formed, the rotation shaft 220 that rotates the star wheel 60, the bearing portion 230 that supports the rotation shaft 220 while allowing rotation of the rotation shaft 220, and the air coupling 240 that is fixed to the periphery of the rotation shaft 220 and that generates suction force to suck the inspection object 101 to the housing portion 110 in the air holes 60a, 60b, 220a, and 220b (see FIG. 3). According to this configuration, formation of a valve plate including an adjustable mechanism on the conveyance surface 201 is unnecessary. Accordingly, it is possible to prevent contents and broken pieces of containers from falling from a gap between the valve plate and the conveyance surface 201 in breakage of containers and to improve cleanability.

Moreover, in the first embodiment, the air coupling 240 includes the paired arc shaped holding portions 241 and 242, the hinge 243 that connects the one ends of the holding portions 241 and 242 to each other while allowing turning of the holding portions 241 and 242, and the coil spring 245 that connects the other ends of the holding portions 241 and 242 to each other and that generates pressing force pressing the holding portions 241 and 242 toward the outer peripheral surface of the rotation shaft 220 (see FIG. 5). According to this configuration, the rotation shaft 220 can be rotated with the holding portions 241 and 242 being in close contact with the outer peripheral surface of the rotation shaft 220 and air can be supplied to the air holes 60a, 60b, 220a, and 220b of the rotating rotation shaft 220 without leak.

Moreover, in the first embodiment, the elongated groove 248 is formed to extend in the circumferential direction on the inner peripheral surface 241t of the holding portion 241. According to this configuration, air can be continuously supplied in the range from the branch start position (a1, b1) to the branch end position (a2, b2) (see FIG. 7). As a result, the housing portion 110 of the star wheel 60 can keep on holding the inspection object 101 to the branch end.

Moreover, in the first embodiment, the air coupling 240 is fixed to the conveyance stage 202 in which the conveyance surface 201 is formed (see FIG. 3). According to this configuration, there is no need to additionally provide a fixing stage for fixing the air coupling 240.

Moreover, in the first embodiment, the bearing portion 230 incudes the cylindrical base member 231 that supports the bearings 232 and 233. The annular flange portion 231a for fixing the base member 231 to the conveyance surface 201 is formed at the upper end of the base member 231. The flange portion 231a protrudes upward (toward the star wheel 60) from the conveyance surface 201. According to this configuration, even if the inspection object 101 breaks and a medical solution leaks out, it is possible to suppress the medical solution from flowing from the flange portion 231a to the rotation shaft 220 side.

Second Embodiment

Figure 9:
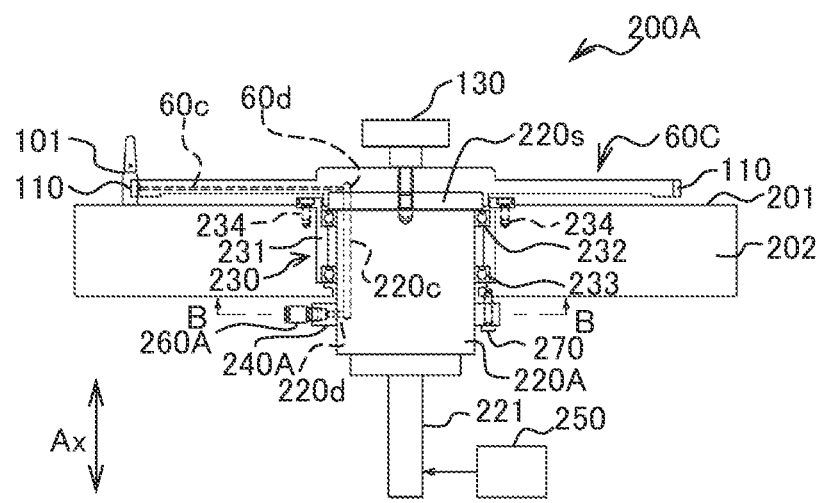
FIG. 9 is a vertical cross-sectional diagram illustrating a container screening device of a second embodiment.

FIG. 9 is a vertical cross-sectional diagram illustrating a container screening device of a second embodiment. Note that, in the second embodiment, configurations that are substantially the same as those in the first embodiment are denoted by the same reference signs and overlapped description is omitted.

As illustrated in FIG. 9, a container screening device 200A includes a star wheel 60C that is arranged on the conveyance surface 201 on which the inspection objects 101 (containers) are conveyed and that has an outer periphery in which multiple housing portions 110 configured to house the inspection objects 101 are formed, a rotation shaft 220A that rotates the star wheel 60C, the bearing portion 230 that supports the rotation shaft 220A while allowing rotation of the rotation shaft 220A, and an air coupling 240A (air block, air coupling) that supplies air to the housing portions 110.

Air holes 60c extending in radial directions are formed in the star wheel 60C. One ends of the air holes 60c extend to the housing portions 110 and the other ends extend to positions close to the rotation center of the star wheel 60C. In detail, the other ends of the air holes 60c extend to positions overlapping the rotation shaft 220A in an axial direction (vertical direction). Moreover, air holes 60d that communicate with the other ends of the air holes 60c and extend in the axial direction (vertical direction) for a short distance are formed in the star wheel 60C. Lower ends of the air holes 60d are formed to be open on a bottom surface of the star wheel 60C. The air holes 60c and 60d are thus formed to penetrate an interior of the star wheel 60C.

Air holes 220c extending in the axial direction of the rotation shaft 220A are formed in the rotation shaft 220A.

Upper ends (one ends) of the air holes 220c are formed to be open on the upper end surface 220s of the rotation shaft 220A. Moreover, air holes 220d that communicate with lower ends (other ends) of the air holes 220c and extend outward in radial directions are formed in the rotation shaft 220A. As described above, the air holes 220c and 220d are formed to penetrate an interior of the rotation shaft 220A.

The air coupling 240A is a unit that supplies air to the air holes 220d of the rotation shaft 220A and is arranged below the conveyance stage 202. Moreover, the air coupling 240A is formed in a substantially annular shape to surround the rotation shaft 220A. Furthermore, the air coupling 240A is fixed to the lower surface of the conveyance stage 202 with the bolts 270. The thickness of the conveyance stage 202 is formed to be smaller than the length of the rotation shaft 220A in the axial direction.

Figure 10:
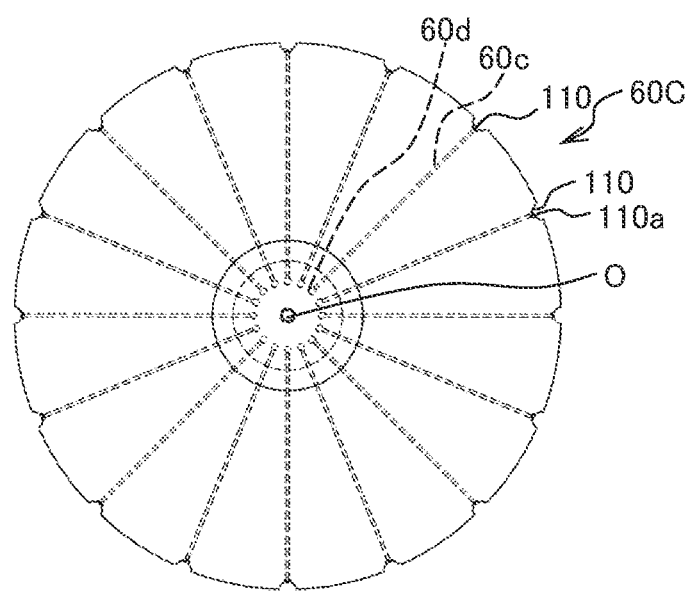
FIG. 10 is a plan diagram illustrating a star wheel of the container screening device in the second embodiment.

FIG. 10 is a plan diagram illustrating the star wheel of the container screening device in the second embodiment.

As illustrated in FIG. 10, 16 housing portions 110 are formed in the outer peripheral edge portion of the disc in the star wheel 60C. The housing portions 110 are arranged at even intervals (every 22.5 degrees) in the circumferential direction.

In the star wheel 60C, the air holes 60c extending in the radial directions are formed at positions corresponding to the respective housing portions 110. All air holes 60c are formed to have the same length. Specifically, the jetting ports 110a that blows out air on wall surfaces of the housing portions 110 is formed at one ends of the air holes 60c on the outer side in the radial direction. Moreover, the air holes 60c extend toward the rotation center O of the star wheel 60C such that the other ends of the air holes 60c on the inner side in the radial direction communicate with the air holes 60d.

Figure 11:
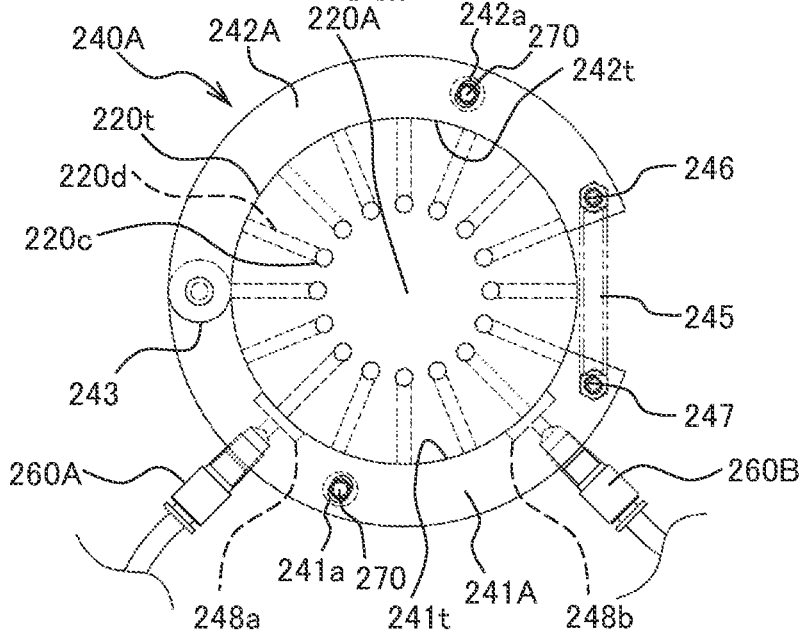
FIG. 11 is a cross-sectional diagram along the B-B line in FIG. 9.

FIG. 11 is a cross-sectional diagram along the B-B line in FIG. 9.

As illustrated in FIG. 11, in the air coupling 240A, paired holding portions 241A and 242A formed in arc shapes are turnably connected to each other by the hinge 243. The holding portions 241A and 242A can be thus attached to the rotation shaft 220A to embrace it.

Moreover, elongated grooves 248a and 248b are formed on an inner peripheral surface 241t of the holding portion 241A to extend in the circumferential direction. The elongated grooves 248a and 248b are formed away from each other in the circumferential direction. Furthermore, in the holding portion 241A, a tube 260A configured to introduce air (gas) is provided at a position where the elongated groove 248a is formed, and the tube 260A and the elongated groove 248a communicate with each other. Moreover, in the holding portion 241A, a tube 260B configured to introduce air is provided at a position where the elongated groove 248b is formed, and the tube 260B and the elongated groove 248b communicate with each other. Furthermore, the length of each of the elongated grooves 248a and 248b in the circumferential direction is set such that the elongated groove communicates with one of the air holes 220d.

Figure 12:
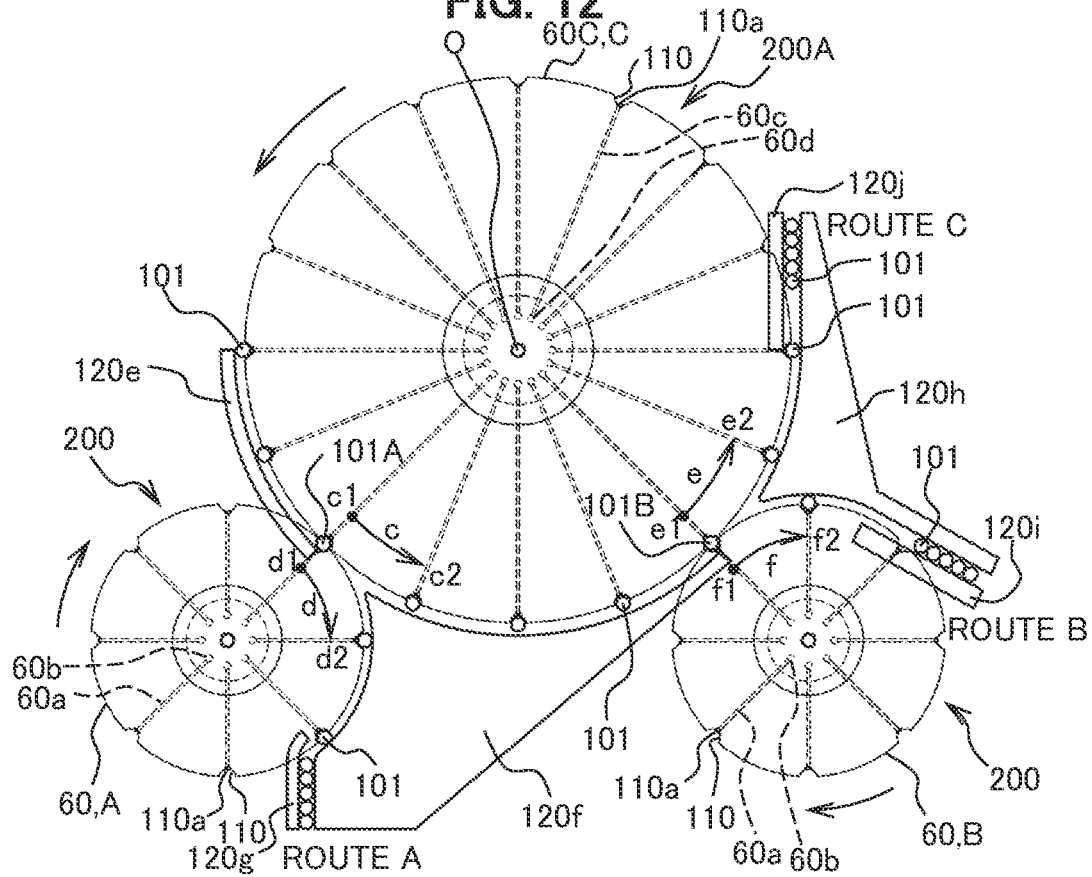
FIG. 12 is a diagram illustrating a conveyance operation of the container screening device in the second embodiment.

FIG. 12 is a diagram illustrating a conveyance operation of the container screening device in the second embodiment.

As illustrated in FIG. 12, the container screening device is formed by combining the container screening device 200A and the container screening devices 200 and 200. In the second embodiment, two discharge routes (branch portions) are formed for one star wheel 60C by using the star wheels 60 and 60. In the following explanation, the star wheel 60C is referred to as a star wheel C and the star wheels 60 and 60 are referred to as star wheels A and B.

Moreover, in the container screening device, a guide 120e having a shape along an outer peripheral surface of the star wheel C is provided on the entrance side of the star wheel C (upstream side in a flow direction of the inspection objects 101) on the conveyance surface 201 (see FIG. 9). The guide 120e is a guide that prevents the inspection object 101 from protruding out from the housing portion 110 of the star wheel C.

Furthermore, a guide 120f having a shape along the outer peripheral surfaces of the star wheels C and A is provided on the exit side of the star wheel C (downstream side of the flow direction of the inspection objects 101) on the conveyance surface 201. In this case, air jet out from the housing portion 110 of the star wheel C via the air holes 220c and 220d (see FIG. 11) and the air holes 60c and 60d allows the inspection object 101 to be conveyed with the star wheel C holding the inspection object 101. Moreover, air jet out from the housing portion 110 of the star wheel A allows the inspection object 101 to be delivered from the star wheel C to the star wheel A.

Moreover, a guide 120g that guides the inspection object 101 in a direction away from the star wheel A together with the guide 120f is provided on the conveyance surface 201. The inspection object 101 can be thereby discharged to a discharge route A.

Furthermore, a guide 120h having a shape along the outer peripheral surfaces of the star wheels B and C is provided on the exit side of the star wheel C on the conveyance surface 201. In this case, air jet out from the housing portion 110 of the star wheel C allows the inspection object 101 to be conveyed with the star wheel C holding the inspection object 101. Moreover, air jet out from the housing portion 110 of the star wheel B allows the inspection object 101 to be delivered from the star wheel C to the star wheel B.

Moreover, a guide 120i that guides the inspection object 101 in a direction away from the star wheel B together with the guide 120h is provided on the conveyance surface 201. The inspection object 101 can be thereby discharged to a discharge route B.

Furthermore, a guide 120j that guides the inspection object 101 in a direction away from the star wheel C together with the guide 120h is provided on the conveyance surface 201. The inspection object 101 can be thereby discharged to a discharge route C.

In FIG. 12, in the case where an inspection object 101A (101) is to be held in the star wheel C, air is jetted out from the housing portion 110 of the star wheel C and the air jet out from the housing portion 110 of the star wheel A is stopped when the inspection object 101A is at a position c1 where it is surrounded by the star wheel C and the star wheel A. Specifically, when the corresponding air hole 220d (see FIG. 11) faces the elongated groove 248a (see FIG. 11), air is introduced into the elongated groove 248a from the tube 260A (see FIG. 11). The air thereby passes through the air holes 220d and 220c and is introduced into the air hole 60d and 60c of the star wheel C. Then, the air is jetted out from the jetting port 110a of the corresponding housing portion 110 and the inspection object 101A is sucked to the housing portion 110 of the star wheel C. The air is jetted out from the jetting port 110a until the inspection object 101A reaches a position c2 where the branch ends.

Meanwhile, in the case where the inspection object 101A (101) is to be discharged to the route A, air is jetted out from the housing portion 110 of the star wheel A and the air jet out from the housing portion 110 of the star wheel C is stopped when the inspection object 101A is at a position d1 where it is surrounded by the star wheel A and the star wheel C. The air thereby passes through the air holes 220b and 220a (see FIG. 3) and is introduced into the air holes 60b and 60a of the star wheel A. Then, the air is jetted out from the jetting port 110a of the corresponding housing portion 110 and the inspection object 101A is sucked to the housing portion 110 of the star wheel A. The air is jetted out from the jetting port 110a until the inspection object 101A reaches a position d2 where the branch ends.

Moreover, in the case where an inspection object 101B (101) is to be held in the star wheel C, air is jetted out from the housing portion 110 of the star wheel C and the air jet out from the housing portion 110 of the star wheel B is stopped when the inspection object 101B is at a position e1 where it is surrounded by the star wheel C and the star wheel B. Specifically, when the corresponding air hole 220d (see FIG. 11) faces the elongated groove 248b (see FIG. 11), air is introduced into the elongated groove 248b from the tube 260B (see FIG. 11). The air thereby passes through the air holes 220d and 220c (see FIG. 11) and is introduced into the air holes 60d and 60c of the star wheel C. Then, the air is jetted out from the jetting port 110a of the corresponding housing portion 110 and the inspection object 101B is sucked to the housing portion 110 of the star wheel C. The air is jetted out from the jetting port 110a until the inspection object 101B reaches a position e2 where the branch ends.

Meanwhile, in the case where the inspection object 101B (101) is to be discharged to the route B, air is jetted out from the housing portion 110 of the star wheel B and the air jet out from the housing portion 110 of the star wheel C is stopped when the inspection object 101B is at a position f1 where it is surrounded by the star wheel B and the star wheel C. The air thereby passes through the air holes 220b and 220a (see FIG. 3) and is introduced into the air holes 60b and 60a of the star wheel B. Then, the air is jetted out from the jetting port 110a of the corresponding housing portion 110 and the inspection object 101B is sucked to the housing portion 110 of the star wheel B. The air is jetted out from the jetting port 110a until the inspection object 101B reaches a position f2 where the branch ends.

In the second embodiment, multiple elongated grooves (elongated grooves 248a and 248b) are formed in the circumferential direction in the air coupling 240A (see FIG. 11). This allows multiple sorting portions (branch portions) to be provided for one star wheel C.

Third Embodiment

Figure 13:
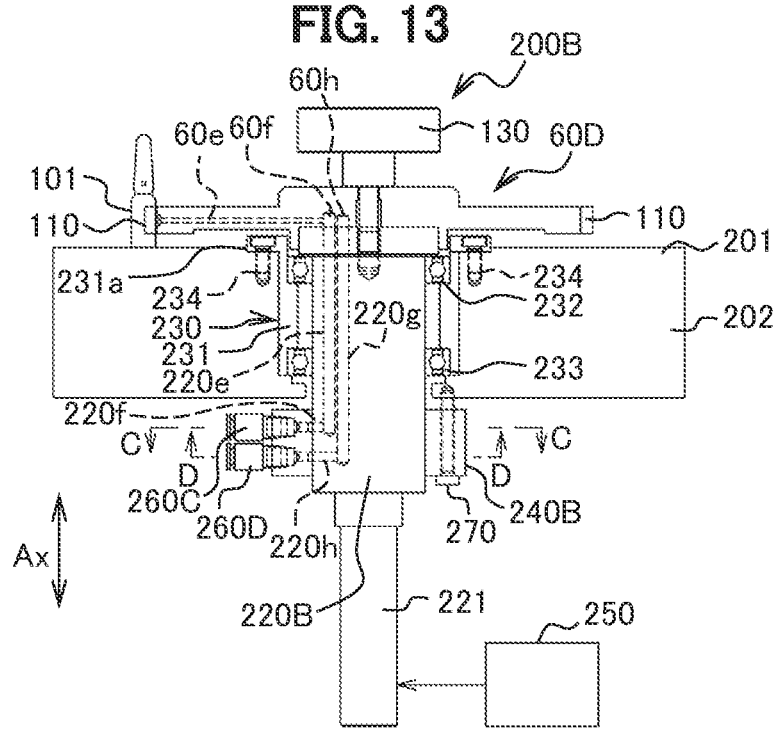
FIG. 13 is a vertical cross-sectional diagram illustrating a container screening device of a third embodiment.

FIG. 13 is a vertical cross-sectional diagram illustrating a container screening device of a third embodiment.

As illustrated in FIG. 13, a container screening device 200B includes a star wheel 60D that is arranged on the conveyance surface 201 on which the inspection objects 101 (containers) are conveyed and that has an outer periphery in which multiple housing portions 110 configured to house the inspection objects 101 are formed and a rotation shaft 220B that rotates together with the star wheel 60D. Moreover, the container screening device 200B includes air holes 220e, 220f, 220g, 220h, 60e, 60f, 60g, and 60h (see FIG. 14 for the air hole 60g) that penetrate interiors of the star wheel 60D and the rotation shaft 220B and that allow the rotation shaft 220B and the housing portions 110 to communicate with one another. Furthermore, the container screening device 200B includes an air coupling 240B (container suction force generation member) that is fixed to a periphery of the rotation shaft 220B and that generates suction force to suck the inspection objects 101 to the housing portions 110 in the air holes 220e, 220f, 220g, 220h, 60e, 60f, 60g, and 60h.

The air holes 220e and 220g are formed to extend in the axial direction Ax of the rotation shaft 220B. Moreover, the air holes 220e are located on the outer side of the air holes 220g in the radial direction. Furthermore, the air holes 220e are formed to be shorter than the air holes 220g and lower ends of the air holes 220e are located above lower ends of the air holes 220g. The air holes 60f communicating with the air holes 220e are formed in the star wheel 60D. Moreover, the air holes 60h communicating with the air holes 220g are formed in the star wheel 60D.

Figure 14:
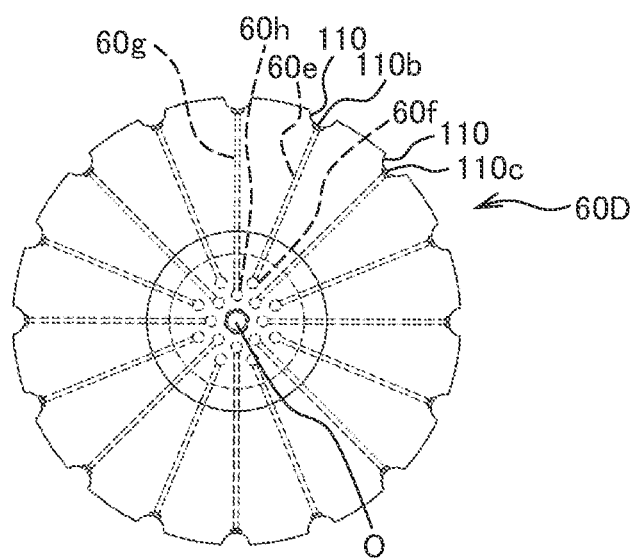
FIG. 14 is a plan diagram illustrating a star wheel of the container screening device in the third embodiment.

FIG. 14 is a plan diagram illustrating the star wheel of the container screening device in the third embodiment.

As illustrated in FIG. 14, 16 housing portions 110 are formed in the outer peripheral edge portion of the disc in the star wheel 60D. The housing portions 110 are arranged at even intervals (every 22.5 degrees) in the circumferential direction.

The air holes 60e and 60g extending in the radial directions are alternately formed in the star wheel 60D. Moreover, the air holes 60e are formed at even intervals in the circumferential direction. The air holes 60g are formed at even intervals in the circumferential direction. Furthermore, the air holes 60e and 60g are alternately formed in the circumferential direction and are formed at even intervals (every 22.5°) in the circumferential direction as a whole.

One ends of the air holes 60e extend to the housing portions 110 and the other ends are connected to the air holes 60f. One ends of the air holes 60g extend to the housing portions 110 and the other ends are connected to the air holes 60h. Moreover, jetting ports 110b that jet out air are formed on wall surfaces of the housing portions 110 to which the air holes 60e are connected. Jetting ports 110c that jets out air are formed on wall surfaces of the housing portions 110 to which the air holes 60g are connected. Moreover, the other ends (end portions on the inner side in the radial direction) of the air holes 60g are located closer to the rotation center O than the other ends (end portions on the inner side in the radial direction) of the air holes 60e are.

The other ends of the air holes 60e and 60g extend to the positions overlapping the rotation shaft 220B (see FIG. 13) in the axial direction (vertical direction) (see FIG. 13). Moreover, the air holes 60f and 60h that communicate with the other ends of the air holes 60e and 60g and that extend in the axial direction (vertical direction) for a short distance are formed in the star wheel 60D. Lower ends of the air holes 60f and 60h are formed to be open on a bottom surface of the star wheel 60D. The air holes 60e, 60f, 60g, and 60h are thus formed to penetrate the interior of the star wheel 60D.

The air coupling 240B is a unit that supplies air to the air holes 220e and 220g of the rotation shaft 220B and is arranged below the conveyance stage 202 (see FIG. 13). Moreover, the air coupling 240B is formed in a substantially annular shape to surround the rotation shaft 220B. Furthermore, the air coupling 240B is fixed to the lower surface of the conveyance stage 202 with the bolts 270. The thickness of the conveyance stage 202 is formed to be smaller than the length of the rotation shaft 220B in the axial direction.

Figure 15:
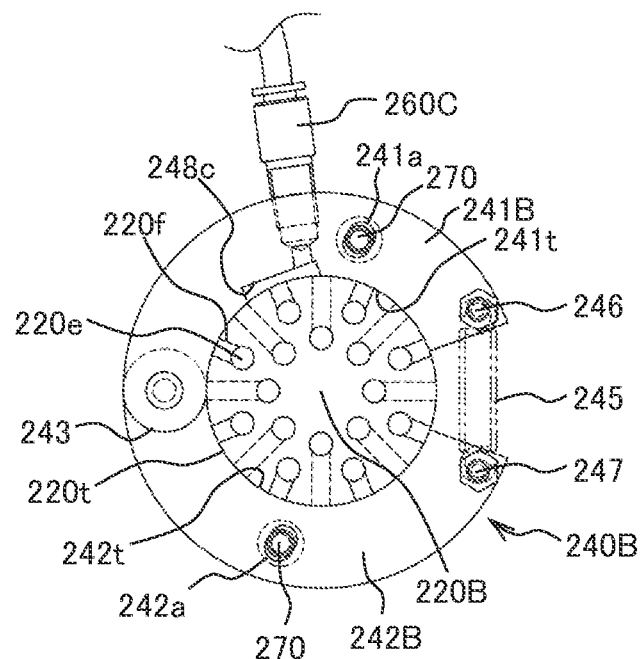
FIG. 15 is a cross-sectional diagram along the C-C line in FIG. 13.

FIG. 15 is a cross-sectional diagram along the C-C line in FIG. 13.

As illustrated in FIG. 15, in the air coupling 240B, paired holding portions 241B and 242B formed in arc shapes are turnably connected to each other by the hinge 243. The holding portions 241B and 242B can be thus made to embrace the rotation shaft 220B.

An elongated groove 248c is formed on an inner peripheral surface 241t of the holding portion 241B to extend in the circumferential direction. The elongated groove 248c is formed to communicate with the air holes 220*f*. Moreover, in the holding portion 241B, a tube 260C configured to introduce air is provided at a position where the elongated groove 248*c* is formed, and the tube 260C and the elongated groove 248*c* communicate with each other. Providing the elongated groove 248*c* allows air to be continuously supplied to the air hole 220*f* for a predetermined section of rotation of the rotation shaft 220B.

Figure 16:
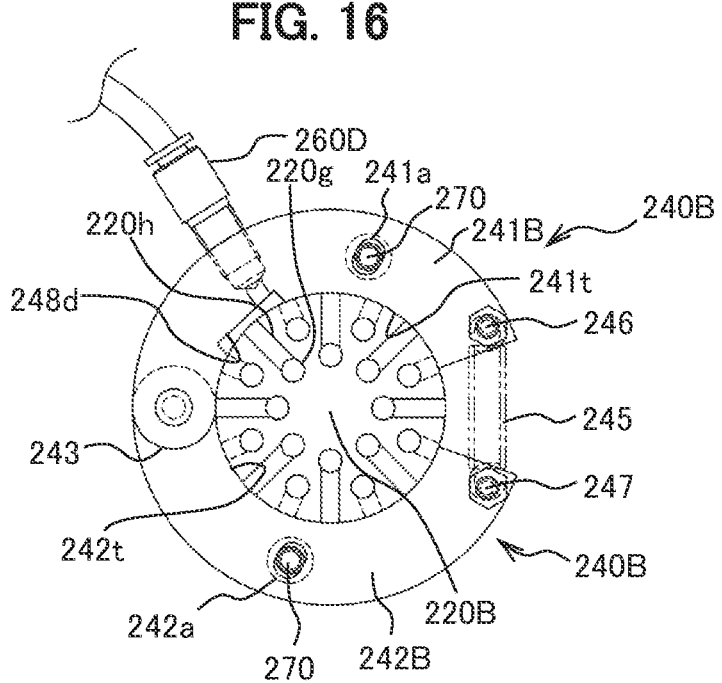
FIG. 16 is a cross-sectional diagram along the D-D line in FIG. 13.

FIG. 16 is a cross-sectional diagram along the D-D line is FIG. 13.

As illustrated in FIG. 16, an elongated groove 248*d* is formed on the inner peripheral surface 241*t* of the holding portion 241B to extend in the circumferential direction. The elongated groove 248*d* is located below the aforementioned elongated groove 248*c* in the axial direction. Moreover, the elongated groove 248*d* is formed to communicate with the air holes 220*h*. Furthermore, in the holding portion 241B, a tube 260D configured to introduce air is provided at a position where the elongated groove 248*d* is formed, and the tube 260D and the elongated groove 248*d* communicate with each other. Providing the elongated groove 248*d* allows air to be continuously supplied to the air hole 220*h* for a predetermined section of rotation of the rotation shaft 220B.

FIG. 17 is a diagram illustrating a conveyance operation of the container screening device in the third embodiment.

The container screening device illustrated in FIG. 17 is formed by combining the container screening devices 200B and 200B and discharge routes A and B are formed by using one sorting portion. Moreover, in the following explanation, one (left in FIG. 17) star wheel 60D is referred to as a star wheel D and the other (right in FIG. 17) star wheel 60D is referred to as a star wheel E.

The guide 120*a* having a shape along an outer peripheral surface of the star wheel D is provided on the entrance side of the star wheel D on the conveyance surface 201 (see FIG. 13). Moreover, the guide 120*b* having a shape along outer peripheral surfaces of the star wheels D and E are provided on the exit side of the star wheels D and E on the conveyance surface 201. Furthermore, the guide 120*c* that guides the inspection object 101 in a direction away from the star wheel D together with the guide 120*b* is provided on the route A side of the star wheel D on the conveyance surface 201. Moreover, the guide 120*d* that guides the inspection object 101 in a direction away from the star wheel E together with the guide 120*b* is provided on the route B side of the star wheel E on the conveyance surface 201.

In the case where an inspection object 101C (101) is to be discharged to the route A, air is jetted out from the jetting port 110*b* in the housing portion 110 of the star wheel D and the air jet out from the jetting port 110*b* in the housing portion 110 of the star wheel E is stopped when the inspection object 101C (101) is at a position g1 where the inspection object 101C is surrounded by the star wheels D and E. Specifically, when the corresponding air hole 220*h* (see FIG. 16) faces the elongated groove 248*d* (see FIG. 16), air is introduced into the elongated groove 248*d* from the tube 260D (see FIG. 16). The air thereby passes through the air holes 220*h* and 220*g* and is introduced into the air holes 60*h* and 60*g* of the star wheel D. Then, the air is jetted out from the jetting port 110*c* of the corresponding housing portion 110 and the inspection object 101C is sucked to the housing portion 110 of the star wheel D. The air is jetted out from the jetting port 110*c* until the inspection object 101C reaches a position g2 where the branch ends. This is because the elongated groove 248*d* (see FIG. 16) elongating in the circumferential direction is formed in the air coupling 240B and air is thus continuously jetted out while the inspection object 101 is moved from the position g1 to the position g2 (in a range g).

In the case where the inspection object 101C (101) is to be discharged to the route B, air is jetted out from the housing portion 110 of the star wheel E and the air jet out from the housing portion 110 of the star wheel D is stopped when the inspection object 101C is at a position h1 where the inspection object 101C is surrounded by the star wheels D and E. Specifically, when the corresponding air hole 220*h* (see FIG. 16) faces the elongated groove 248*d* (see FIG. 16), air is introduced into the elongated groove 248*d* from the tube 260D (see FIG. 16). The air thereby passes through the air holes 220*h* and 220*g* and is introduced into the air holes 60*h* and 60*g* of the star wheel E. Then, the air is jetted out from the jetting port 110*c* of the corresponding housing portion 110 and the inspection object 101C is sucked to the housing portion 110 of the star wheel E. The air is jetted out from the jetting port 110*c* until the inspection object 101C reaches a position h2 where the branch ends. This is because the elongated groove 248*d* (see FIG. 16) elongating in the circumferential direction is formed in the air coupling 240B and air is thus continuously jetted out while the inspection object 101 is moved from the position h1 to the position h2 (in a range h).

FIG. 18 is a timing chart illustrating a conveyance operation of the container screening device in the third embodiment. Note that the numbers illustrated in FIG. 18 are container numbers as in FIG. 8. Moreover, the horizontal axis represents a rotation angle of the star wheels. In FIG. 17, the inspection object denoted by the reference sign 101C is the first inspection object (container number 1) and the rotation angle in this case is 0°. The inspection object 101 subsequent to the first inspection object 101C is the second inspection object (container number 2).

As illustrated in FIG. 18, air is jetted out (air jet out) from the jetting port 110*c* in the star wheel E and the air jet out from the jetting port 110*c* in the star wheel D is stopped while the inspection object 101 with the container number 1 is conveyed from the position h1 to the position h2 (in the range h). The inspection object 101C with the container number 1 is thereby conveyed while being held in the housing portion 110 of the star wheel E until the inspection object 101C is moved from the position h1 to the position h2 (branch end). Then, when the inspection object 101 with the container number 1 passes the position h2 (rotation angle 45°), the air jet out from the jetting port 110*c* in the star wheel E is stopped. Generation of the suction force to suck the inspection object 101C is thereby stopped. Then, the inspection object 101 is discharged to the route B by the guide 120*b* and the guide 120*d*.

Regarding the inspection object 101 with the container number 2 subsequent to the container number 1, when the star wheel E is at a position (rotation angle 22.5°) in the middle of h1 and h2, air is jetted out from the jetting port 110*b* in the housing portion 110 of the star wheel E and the air jet out from the jetting port 110*b* in the housing portion 110 of the star wheel D is stopped. The air is jetted out from the jetting port 110*b* in the star wheel E and the air jet out from the jetting port 110*b* in the star wheel D is stopped while the inspection object 101 with the container number 2 is conveyed from the position h1 to the position h2 (in the range h). The inspection object 101 with the container number 2 is thereby conveyed while being held in the housing portion 110 of the star wheel E until the inspection object 101 reaches the position h2 (branch end). Then, when the inspection object 101 with the container number 2 passes the position h2 (rotation angle 67.5°), generation of the suction force to suck the inspection object 101 with the container number 2 to the housing portion 110 is stopped. Then, the inspection object 101 is discharged to the route B by the guide 120*b* and the guide 120*c*.

As described above, the second inspection object 101 can be sucked to the star wheel E while the first inspection object 101 is sucked to the star wheel E.

Regarding the inspection object 101 with the container number 3 subsequent to the container number 2, at the rotation angle 45°, air is jetted out from the jetting port 110*c* in the housing portion 110 of the star wheel D and the air jet out from the jetting port 110*c* in the housing portion 110 of the star wheel E is stopped. The air is jetted out from the jetting port 110*c* in the star wheel D and the air jet out from the star wheel E is stopped while the inspection object 101 with the container number 3 is conveyed from the position g1 to the position g2 (in the range g). The inspection object 101 with the container number 3 is thereby conveyed while being held in the housing portion 110 of the star wheel D until the inspection object 101 is moved from the position g1 to the position g2 (branch end). Then, when the inspection object 101 with the container number 3 passes the position g2 (rotation angle 90°), generation of the suction force to suck the inspection object 101 with the container number 3 to the housing portion 110 is stopped. Then, the inspection object 101 is discharged to the route A by the guide 120*b* and the guide 120*c*.

Regarding the inspection object 101 with the container number 4 subsequent to the container number 3, at the rotation angle 67.5°, air is jetted out from the jetting port 110*b* in the housing portion 110 of the star wheel D and the air jet out from the jetting port 110*b* in the housing portion 110 of the star wheel E is stopped. The air is jetted out from the star wheel D and the air jet out from the star wheel E is stopped while the inspection object 101 with the container number 4 is conveyed from the position g1 to the position g2 (in the range g). The inspection object 101 with the container number 4 is thereby kept on being held in the housing portion 110 of the star wheel D until the inspection object 101 reaches the position g2 (branch end). Then, when the inspection object 101 with the container number 4 passes the position g2 (rotation angle 112.5°), generation of the suction force to suck the inspection object 101 with the container number 4 to the housing portion 110 is stopped. Then, the inspection object 101 is discharged to the route A by the guide 120*b* and the guide 120*c*.

The inspection object 101 with the container number 5 is discharged to the route A like the inspection object 101 with the container number 3. The inspection object 101 with the container number 6 is discharged to the route A like the inspection object 101 with the container number 4. The inspection object 101 with the container number 7 is discharged to the route B like the inspection object 101 with the container number 1. The inspection object 101 with the container number 8 is discharged to the route B like the inspection object 101 with the container number 2. The inspection object 101 with the container number 9 is discharged to the route A like the inspection objects 101 with the container numbers 3 and 5. The inspection object 101 with the container number 10 is discharged to the route A like the inspection objects 101 with the container numbers 4 and 6. The inspection object 101 with the container number 11 is discharged to the route B like the inspection object 101 with the container number 7. The inspection object 101 with the container number 12 is discharged to the route B like the inspection objects 101 with the container numbers 8 and 2.

Appropriately controlling the container screening devices 200B including the star wheels D and E as described above enables sorting of the inspection objects 101 to the routes A and B.

As described above, in the third embodiment, the air couplings 240B are provided to overlap each other in the axial direction Ax of the rotation shaft 220B. This allows a sorting step of an inspection object 101 to be started during a sorting step (during sucking) of another inspection object 101. More inspection objects 101 can be sorted while the star wheel 60D rotates once.

The present invention is not limited to the aforementioned embodiments and includes various modified examples. For example, although the example in which the container screening device is formed by combining the star wheels is described in the aforementioned embodiments, a configuration in which the star wheel and a linear conveyance route are combined and the container screening device (container sorting mechanism) is provided only on the star wheel side may be employed.

Moreover, although the example in which the mechanism that sucks the inspection object 101 to the housing portion 110 has the configuration that sucks the inspection object 101 by jetting out air from the jetting port 110*a* in the housing portion 110 is described in the aforementioned embodiments, a configuration that sucks the inspection object 101 to the housing portion 110 by sucking air from the jetting port 110*a* and generating negative pressure may be employed.

LIST OF REFERENCE SIGNS

60, 60C, 60D star wheel
60*a*, 60*b*, 60*c*, 60*d* air hole
101 inspection object (container)
110 housing portion
110*a*, 110*b*, 110*c* jetting port
200, 200A, 200B container screening device
201 conveyance surface
202 conveyance stage
220, 220A, 220B rotation shaft
220*a* to 220*h* air hole
230 bearing portion
231 base member
231*a* flange portion
232, 233 bearing
234 bolt
240 air coupling (container suction force generation member)
241, 242 holding portion
243 hinge
245 coil spring (elastic member)
246, 247 lock portion
248, 248*a*, 248*b*, 248*c* elongated groove
250 electric motor
270 bolt

The invention claimed is:

1. A container screening device comprising:
   a star wheel which is arranged on or above a conveyance surface on which containers are conveyed and which has an outer periphery formed with plural housing portions configured to house the containers;

a rotation shaft configured to rotate the star wheel;
a bearing portion rotatably supporting the rotation shaft;
communication passages which extend through interiors of the star wheel and the rotation shaft and which communicate with the rotation shaft and the housing portions; and
a container suction force generation member fixed to a periphery of the rotation shaft and configured to generate suction force in the communication passages to suck the containers to the housing portions,
wherein the container suction force generation member comprises:
paired arc-shaped holding portions;
a hinge turnably connecting one end of each of the holding portions to each other; and
an elastic member connecting another end of each of the holding portions to each other and configured to generate pressing force to press the holding portions toward an outer peripheral surface of the rotation shaft.

2. The container screening device as claimed in claim 1, wherein the container suction force generation member is configured to supply gas to the communication passages and jet out the gas from the housing portions.

3. The container screening device as claimed in claim 1, wherein an elongated groove is formed on inner peripheral surfaces of the holding portions in a circumferential direction.

4. The container screening device as claimed in claim 1, wherein the container suction force generation member is fixed to a conveyance stage having the conveyance surface.

5. The container screening device as claimed in claim 3, wherein plural elongated grooves are formed in the circumferential direction.

6. A container screening device comprising:
a star wheel which is arranged on or above a conveyance surface on which containers are conveyed and which has an outer periphery formed with plural housing portions configured to house the containers;
a rotation shaft configured to rotate the star wheel;
a bearing portion rotatably supporting the rotation shaft;
communication passages which extend through interiors of the star wheel and the rotation shaft and which communicate with the rotation shaft and the housing portions; and
a container suction force generation member fixed to a periphery of the rotation shaft and configured to generate suction force in the communication passages to suck the containers to the housing portions,
wherein container suction force generation members are provided to overlap each other in an axial direction of the rotation shaft.

7. A container screening device comprising:
a star wheel which is arranged on or above a conveyance surface on which containers are conveyed and which has an outer periphery formed with plural housing portions configured to house the containers;
a rotation shaft configured to rotate the star wheel;
a bearing portion rotatably supporting the rotation shaft;
communication passages which extend through interiors of the star wheel and the rotation shaft and which communicate with the rotation shaft and the housing portions; and
a container suction force generation member fixed to a periphery of the rotation shaft and configured to generate suction force in the communication passages to suck the containers to the housing portions, wherein
the bearing portion comprises a cylindrical base member supporting a bearing,
the base member includes a flange portion used to fix the base member to the conveyance surface, and
the flange portion protrudes from the conveyance surface toward the star wheel.

* * * * *